United States Patent [19]
Bogart et al.

[11] Patent Number: 6,163,607
[45] Date of Patent: *Dec. 19, 2000

[54] OPTIMIZING CALL-CENTER PERFORMANCE BY USING PREDICTIVE DATA TO DISTRIBUTE AGENTS AMONG CALLS

[75] Inventors: Frank J. Bogart, Boulder; Andrew D. Flockhart, Thornton, both of Colo.; Robin H. Foster, Little Silver, N.J.; Joylee E. Kohler, Northglenn, Colo.; Eugene P. Mathews, Barrington, Ill.; Stephen L. Skarzynski, Niwot, Colo.

[73] Assignee: Avaya Technology Corp., Miami Lakes, Fla.

[ * ] Notice: This patent is subject to a terminal disclaimer.

[21] Appl. No.: 09/185,265

[22] Filed: Nov. 3, 1998

Related U.S. Application Data

[63] Continuation-in-part of application No. 09/057,842, Apr. 9, 1998.

[51] Int. Cl.[7] .................................................... H04Q 3/64
[52] U.S. Cl. .......................... 379/266; 379/265; 379/309
[58] Field of Search .................................... 379/265, 266, 379/309, 211, 212

[56] References Cited

U.S. PATENT DOCUMENTS

| | | | |
|---|---|---|---|
| 4,567,323 | 1/1986 | Lottes et al. | 379/266 |
| 5,206,903 | 4/1993 | Kohler et al. | 379/309 |
| 5,291,550 | 3/1994 | Levy et al. | 379/242 |
| 5,299,260 | 3/1994 | Shaio | 379/265 |
| 5,309,513 | 5/1994 | Rose | 379/265 |

(List continued on next page.)

FOREIGN PATENT DOCUMENTS

| | | | |
|---|---|---|---|
| 0740450 | 10/1996 | European Pat. Off. | H04M 3/50 |
| 0817455 | 1/1998 | European Pat. Off. | H04M 3/50 |
| 9209164 | 5/1992 | WIPO | H04M 3/00 |

OTHER PUBLICATIONS

Hassler, K.W. et al: Revolutionizing Definity Call Centers In The 1990s AT&T Technical Journal, vol. 74, No. 4, Jul. 1, 1995, pp. 64–73, XP000517580, ISSN: 8756–2324.

U.S. Patent Application, A. V. Tonisson 1, Serial No. 08/790, 010, "Automatic Dynamic Changing of Agents' Call–Handling Assignments", Filed Jan. 28, 1997.

(List continued on next page.)

*Primary Examiner*—Krista Zele
*Assistant Examiner*—William J. Deane, Jr.
*Attorney, Agent, or Firm*—David Volejnicek

[57] ABSTRACT

Selection of a call for handling by a call-center agent (106–108) is based on which call's handling by the available agent will tend to optimize call-center performance criteria such as efficiency (e.g., minimize per-call handling time) or derived benefit (e.g., maximize revenue). Each agent has a service profile for each type of call that they handle. A service profile (400–402) comprises present values of a plurality of service metrics, such as proficiency, profitability, customer satisfaction, and agent satisfaction. When an agent becomes available, the present values of the service metrics of the service profile (500–502) of that agent for each type (e.g. skill) of available call handled by the agent are combined (610) into a score according to one of a plurality of formulas which corresponds to that call type, and a call of the type for which the agent has the best (e.g., either highest or just-sufficient) score is assigned (612) to the agent. Preferably, a call score is also computed (807) for each available call type, based on factors such as the purpose of the call, the call's in-queue wait time, the priority of the call, etc. The call type for which the agent has the best score is selected (812) to be the one for which the call score best matches the agent's corresponding score. When the assigned agent finishes handling the call, his or her performance is evaluated (202–206) based on the service metrics, and the valuations are used (210) to revise the present values of the service metrics of that agent's service profile. The revision process gives (208) more weight to valuations of more-recently-handled calls to reflect both long-term and short-term agent performance trends and variations.

15 Claims, 6 Drawing Sheets

U.S. PATENT DOCUMENTS

| | | | |
|---|---|---|---|
| 5,335,269 | 8/1994 | Steinlicht | 379/266 |
| 5,467,391 | 11/1995 | Donaghue, Jr. et al. | 379/265 |
| 5,537,470 | 7/1996 | Lee | 379/266 |
| 5,546,452 | 8/1996 | Andrews et al. | 379/219 |
| 5,684,872 | 11/1997 | Flockhart et al. | 379/266 |
| 5,818,907 | 10/1998 | Maloney et al. | 379/265 |
| 5,825,869 | 10/1998 | Brooks et al. | 379/265 |
| 5,903,641 | 5/1999 | Tonisson | 379/266 |
| 5,943,416 | 8/1999 | Gisby | 379/265 |

OTHER PUBLICATIONS

Grigonis, R., *Siemens/Rolm's virtual Resumerouting*, Computer Telephony, Oct. 1995, p. 44.

*Ten Great Dollar Saving Applications,* 1997 IVR Supplement to Telecom Library (9–97), p.16.

Definity® Communications System Generic 3, Call Vectoring/Expert Agent Selection (EAS) Guide, AT&T, 555–230–520, Issue 3, Nov. 1993, pp. 1–1—1–10, 2–1—2–22, 3–1—3–15, and 8–1—8–24.

OPTIMIZING CALL-CENTER PERFORMANCE BY USING PREDICTIVE DATA TO DISTRIBUTE AGENTS AMONG CALLS

CROSS REFERENCE TO A RELATED APPLICATION

This application is a continuation-in-part application of U.S. application Ser. No. 09/057,842, filed on Apr. 9, 1998, entitled "Optimizing Call-Center Performance by Using Predictive Data to Distribute Calls Among Agents" which is assigned to the same assignee as this application.

TECHNICAL FIELD

This invention relates to automatic call distribution (ACD) systems, also variously referred to as call centers or telemarketing systems.

BACKGROUND OF THE INVENTION

ACD systems distribute calls—whether inbound or outbound—for handling to any suitable ones of available call-handling agents according to some predefined criteria. In many existing systems, such as the Lucent Technologies Definity® ACD system, the criteria for handling the call from the moment that the ACD system becomes aware of the call until the call is connected to an agent are customer-specifiable (i.e., programmable by the operator of the ACD system) via a capability called call vectoring. Normally in present-day ACD systems, when the ACD system's controller detects that an agent has become available to handle a call, the controller identifies all predefined call-handling skills of the agent (usually in some order of priority) and delivers to the agent the highest-priority oldest-waiting call that matches the agent's highest-priority skill. Generally the only condition that results in a call not being delivered to an available agent is that there are no calls waiting to be handled.

Most present-day call-distribution algorithms focus on being "fair" to callers and to agents. This fairness is reflected by the standard first-in, first-out call to most-idle-agent assignment algorithm. Skills-based routing improves upon this basic algorithm in that it allows each agent to be slotted into a number of categories (splits) based on the agent's skill types and levels.

The primary objective of call-distribution algorithms is to ultimately maximize call center performance. That may involve minimizing cost, maximizing call throughput, and/or maximizing revenue, among others. For example, when a new call arrives, the call should be handled by an agent who either has the ability to produce the most revenue or can handle the call in the shortest amount of time. Also, when an agent becomes available to handle a new call, the agent should handle either the call that has the possibility of generating the most revenue or the call which the agent is most efficient in handling. A telephone call-handling system having such functionality is disclosed in U.S. Pat. No. 5,299,260. However, this system is limited in its capabilities to truly maximize call center performance: it permits only one criterion or metric to be used at any one time to select an agent for handling an individual call, while call center performance is typically a multi-faceted function that involves a number of criteria or metrics.

SUMMARY OF THE INVENTION

This invention is directed to solving these and other problems of the prior art. According to one aspect of the invention, a call is selected for handling by a call handler (e.g., a call center agent) as follows. When a call handler who handles calls of a plurality of types (e.g., calls needing different ones of a plurality of agent skills for their handling) becomes available, a call type for which the call handler has a best present performance characteristic is selected for handling by the call handler. A measure of "best" may be absolute or relative. For example, a "best" characteristic may be the highest characteristic, or it may be a characteristic that most-closely matches (e.g., minimally exceeds) the call's requirements. The determination of the available call for which the call handler has the best performance characteristic is made as follows. A service profile comprising present values of a plurality of service metrics for the plurality of call types is maintained for the call handler. The present values of the plurality of service metrics for each call type having calls available for handling by the call handler are retrieved from the call handler's service profile and are used in one of a plurality of formulas, each corresponding to a different call type, to obtain a performance characteristic score for each of the call types of available calls. Then the one of the available calls for whose call type the call handler has the best score is selected for handling by the call handler. When the call handler finishes handling the selected call, the call handler's performance in handling the selected call is evaluated (quantitatively and/or qualitatively), and the present values of the call handle's service metrics are modified by the valuation to obtain new present values of the service metrics for the call type of the selected call for the call handler. Preferably, the modifications are weighted to give more weight to performance evaluations of calls most-recently handled by this call handler. Then the new present values of the service metrics of the call handler are used in selecting a call for handling by the call handler, until that call type is again selected and the above procedure is repeated. Also, for other call handlers, their own performance characteristic scores for individual call types are used in selecting calls for them to handle.

According to another aspect of the invention, a call handler who has a best present performance characteristic for a call type of an available call is determined and selected to handle the call as follows. A service profile comprising present values of a plurality of service metrics for that call type is maintained for each call handler. For each call handler who is available to handle the available call, the present values of the plurality of service metrics are retrieved from the call handler's service profile and are combined to obtain a performance characteristic score for each of the available call handlers. Also, a call score is obtained for the available call by combining present values of a plurality of characteristics of the call. Then the one of the available call handlers who has a characteristic score that best corresponds to (e.g., matches) the call's score is selected to handle the call. Similarly, a call for which a call handler has a best present performance characteristic is determined and selected for handling by the call handler as follows. A service profile comprising present values of a plurality of service metrics for a plurality of call types is maintained for the call handler. The present values of the plurality of service metrics for each call type having calls available for handling by the call handler are retrieved from the call handler's service profile and are combined to obtain a performance characteristic score for each of the call types of available calls. Also, a call score is obtained for a call of each available call type by combining present values of a plurality of characteristics of each said call. Then the one of the available calls that has a call score that best corresponds the call handler's characteristic score for that corresponding call type is selected for handling by the call handler.

While the method comprises the steps of the just-characterized procedure, the apparatus effects the method steps. The apparatus preferably includes an effector—any entity that effects the corresponding step, unlike a means—for each step. Further, there is preferably provided a computer-readable medium containing software which, when executed in a computer, causes the computer to perform the method steps.

The invention tends to maximize call center performance. For example, when an agent becomes available to handle a new call, the agent is assigned to a call of a type from which this agent can maximize call center performance as measured by a plurality of metrics. Also, when a new call arrives, it goes to an agent who has the best ability to maximize call center performance as measured by the plurality of metrics. This allows for a multi-dimensional, and hence more accurate or refined, measure of call center performance. The invention takes into consideration each agent's historical performance for each call type that the agent handles. Yet, by revising the values of the agent's metrics at the end of every call handled by the agent, the invention automatically adjusts for long-term trends, such as the agent gaining experience and expertise, and short-term trends, such as the agent having "a bad day".

These and other features and advantages of the invention will become more apparent from the following description of an illustrative embodiment of the invention considered together with the drawing.

DETAILED DESCRIPTION

Figure 1:
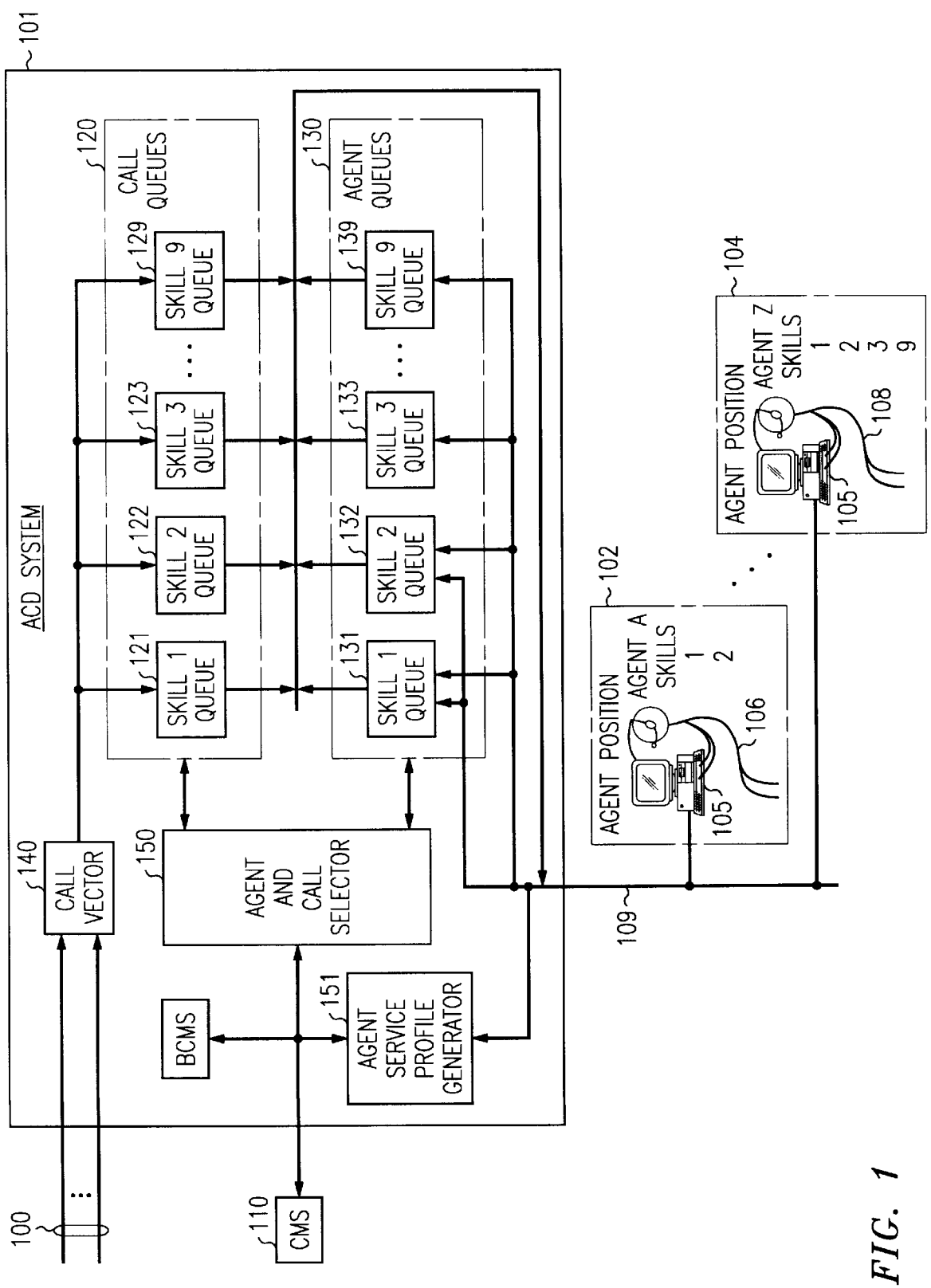
FIG. 1 is a block diagram of a call center that includes an illustrative embodiment of the invention.

FIG. 1 shows an illustrative call center. As is conventional, the call center comprises a plurality of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. Terminals 105 are connected to ACD system 101 by a voice-and-data transmission medium 109. Also, included in ACD system 101 is a conventional basic call management system (BCMS) and connected to ACD system 101 is a conventional call management system (CMS) 110 that gather call records and call-center statistics for use in managing the call center and in generating call-center reports. CMS and BCMS will hereafter be referred to jointly as CMS 110.

ACD system 101 is illustratively the Lucent Technologies Definity® private-branch exchange (PBX)-based ACD system. It is a stored-program-controlled system that conventionally includes interfaces to external communications links, a communications switching fabric, service circuits (e.g., tone generators, announcement circuits, etc.), memory for storing control programs and data, and a processor (i.e., a computer) for executing the stored control programs to control the interfaces and the fabric and to provide automatic call-distribution functionality. Included among the data stored in ACD system 101 are a set 120 of call queues and a set 130 of agent queues. Each call queue 121–129 corresponds to a different agent skill, as does each agent queue 131–139. Conventionally, calls are prioritized, and either are enqueued in individual ones of call queues 120 in their order of priority or are enqueued in different ones of a plurality of call queues that correspond to a skill and each one of which corresponds to a different priority. Likewise, each agent's skills are prioritized according to his or her level of expertise in that skill, and either agents are enqueued in individual ones of agent queues 130 in their order of expertise level or are enqueued in different ones of a plurality of agent queues that correspond to a skill and each one of which corresponds to a different expertise level. Included among the control programs in ACD system 101 is a call vector 140. Calls incoming to the call center on lines or trunks 100 are assigned by call vector 140 to different call queues 121–129 based upon the agent skill that they require for their proper handling. Agents 106–108 who are available for handling calls are assigned to agent queues 131–139 based upon the skills which they possess. An agent may have multiple skills, and hence may be assigned to multiple agent queues 131–139 simultaneously. Furthermore, an agent may have different levels of skill expertise (e.g., skill levels 1–16 in one known system or merely primary (P) skills and secondary (S) skills in another known system), and hence may be assigned to different agent queues 131–139 at different expertise levels. Call vectoring is described in DEFINITY® Communications System Generic 3 Call Vectoring/Expert Agent Selection (EAS) Guide, AT&T publication no. 555-230-520 (Issue 3, November 1993). Skills-based ACD is described in further detail in U.S. Pat. No. 5,206,903.

According to the invention, included among the programs executing on ACD system 101 are an agent and call selector 150 and an agent service-profile generator 151. Selector 150 and generator 151 are stored either in the main memory or in a peripheral memory (e.g., disk, CD-ROM, etc.) or some other computer-readable medium of ACD system 101. Selector 150 and generator 151 effect an assignment between available calls and available agents in a way that tends to maximize the efficiency of the call center.

Figure 2:
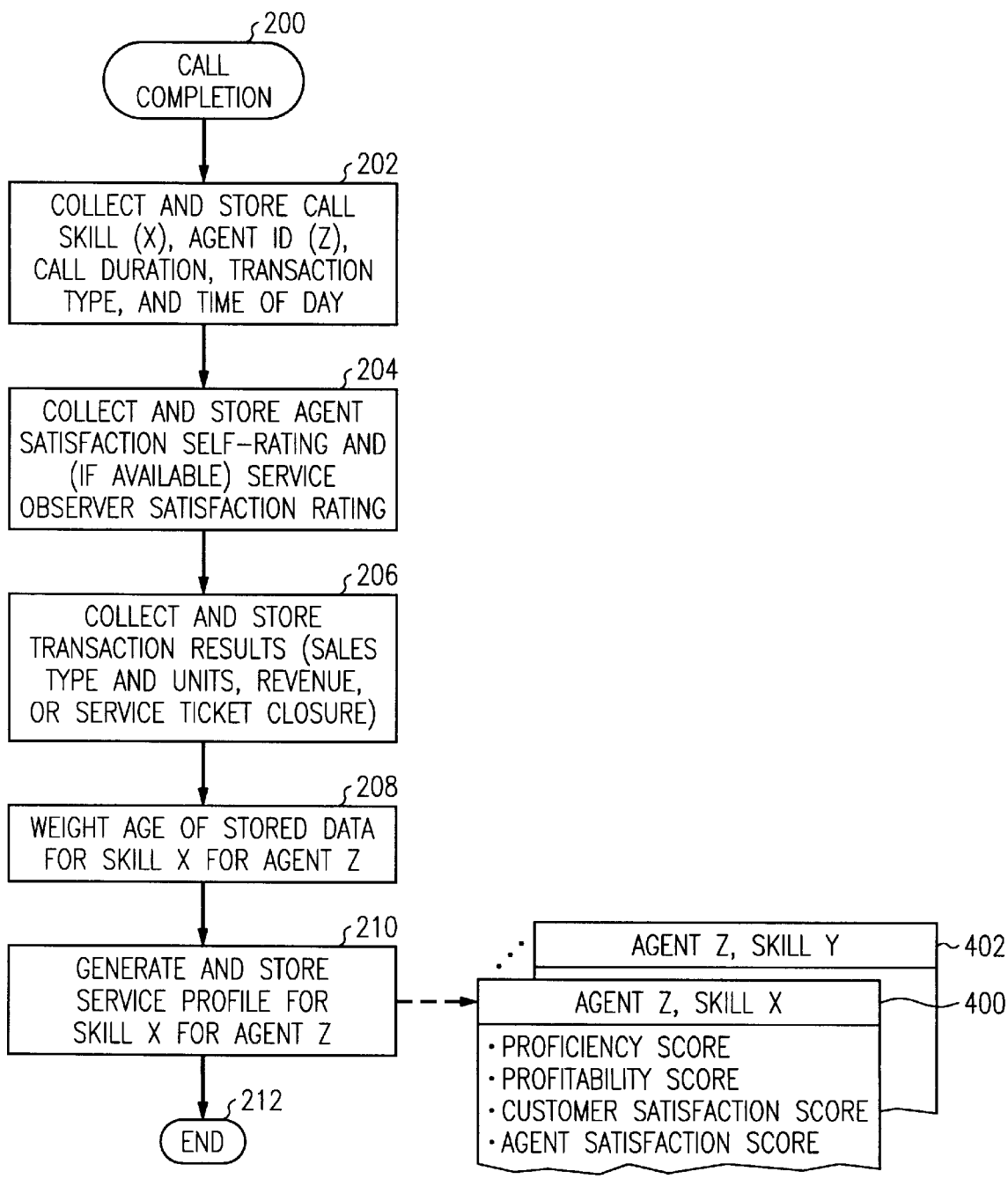
FIG. 2 is a flow diagram of operations performed by an agent service profile generator of the call center of FIG. 1.

The functionality of generator 151 is shown in FIG. 2. At the completion of handling of each call, at step 200, generator 151 collects efficiency metrics for the call, at steps 202–206. From the PBX on which ACD system 101 is based, generator 151 collects data such as the skill (X) involved in handling the call, the identifier of the agent (Z) who handled the call, the call duration, the transaction type (e.g., catalog sale, information request, complaint, etc.), the time-of-day, and call wait time or agent wait time, and stores this information in a database, such as CMS 110, at step 202. From the agent's terminal 105, generator 151 collects and stores the agent's self-rating (the agent entered on his or her terminal) of how well the agent is satisfied with how he or she handled the call, at step 204. Also, if the handling of the call was observed by a service observer (e.g., either was monitored by a supervisor of the call center, or the non-agent party involved in the call was queried by an interactive voice response system for an evaluation of the service received), generator 151 collects and stores the service observer's satisfaction rating, also at step 204. From the agent's terminal 105 (or from a host computer to which the agent's terminal 105 reports transaction data), generator 151 collects and stores the transaction results (e.g., type of sale and number of units sold, or revenue generated, or service ticket closure or escalation, etc.), depending on the transaction type, at step 206. Generator 151 then weights the age of the stored data for skill X for agent Z for this call and previous calls, at step 208. Weighting favors data obtained from most-recent calls over data obtained from calls in the more-distant past. This enables the weighting to strongly reflect present agent performance, as agent performance may change over time due to, for example, an agent becoming more proficient, or "burned out", or having a "good day" or a "bad day". For example, the agent's data from handling all previous calls of skill X is given a weight of 75%, and the data from the just-completed call is given a weight of 25%. Generator 151 then uses the weighted data to generate, or regenerate, a service profile 400 for skill X for agent Z, at step 210. A service profile is a set of scores for a set of metrics, e.g., an expertise score, a proficiency score, a profitability score, a customer satisfaction score, an agent satisfaction score, an agent occupancy score, agent wait time, priority of the call type to the agent or to the call center, and an indication of the percentage of the agent's work that this call type should represent versus how much it actually represents, etc. ACD system 101 has a profile for each skill of each agent. Therefore, there typically exists a plurality of profiles 400–402 for each agent. Generator 151 stores the generated service profile 400 along with the agent's other profiles in a database such as CMS 110, at step 210, and then ends its operation, at step 212.

Figure 3:
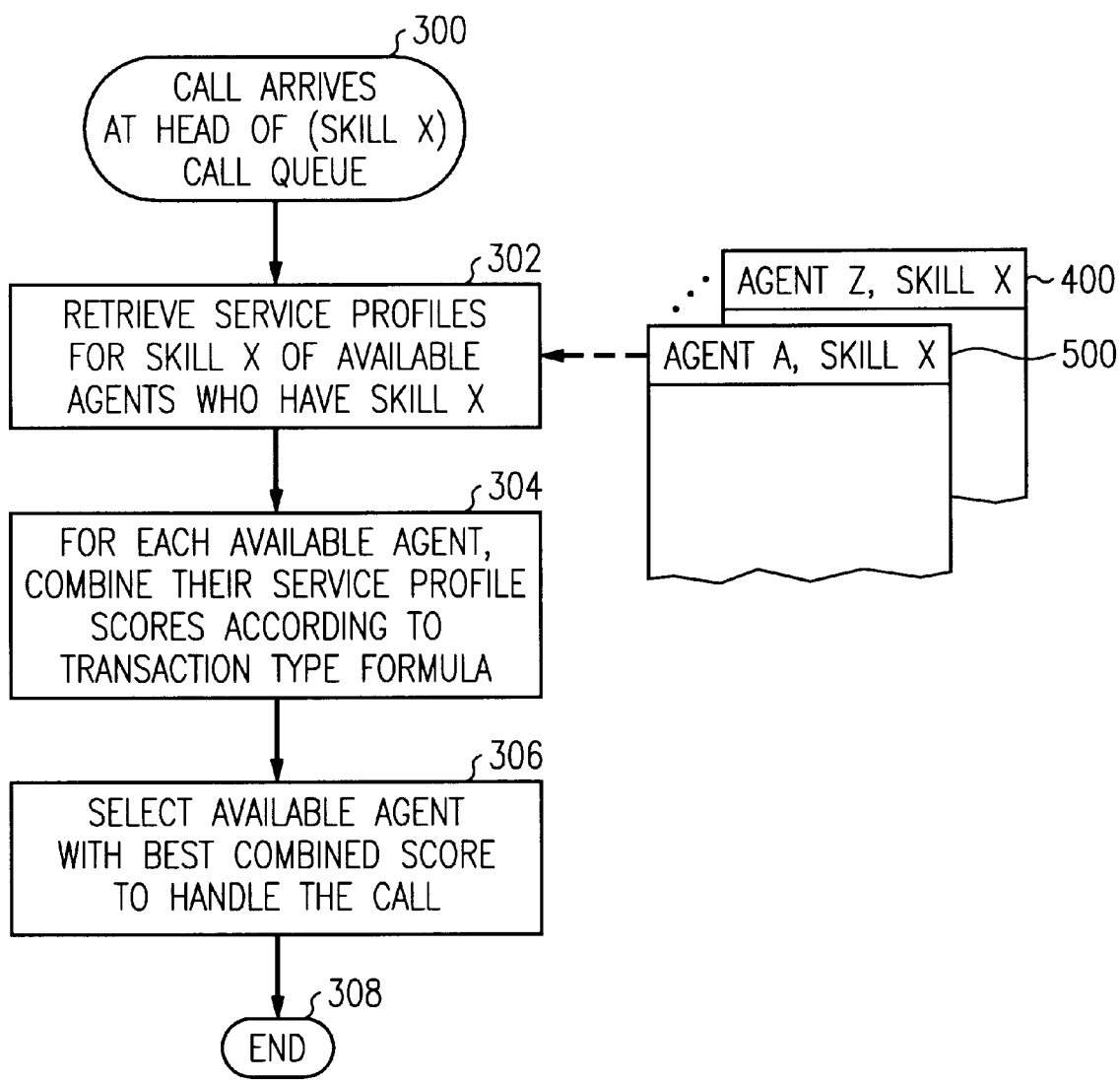
FIG. 3 is a flow diagram of agent-selection operations performed by an agent and call selector of the call center of FIG. 1.

The functionality of agent and call selector 150 in selecting an agent for a call is shown in FIG. 3. Upon arrival of a call at the head of one of the call queues 120 (e.g., a skill X call queue), at step 300, selector 150 retrieves the service profiles 400–500 for skill X of all agents who are available to handle the call and who have skill X, at step 302. Preferably, at step 302 selector 150 retrieves the service profiles not only for agents who are actually idle and enqueued in the skill X agent queue, but also for those agents who ACD system 101 anticipates will become idle within a predetermined amount of time (e.g., a few seconds). Then, for each of the agents whose service profile it retrieved at step 302, selector 150 combines the agent's service profile scores according to a formula which is a function of the transaction type represented by the arrived call, at step 304. The formula for each call type is administered (programmed) into the system and may be either algorithm-based (procedural) or rules-based (expert system engine). Each formula weights the agent's individual service profile scores based on the type of transaction represented by the arrived call. For example, in a complaint transaction, the service observer satisfaction rating is weighted heavily, whereas in a sales transaction the revenue is weighted heavily, and in an information request transaction the proficiency is weighted heavily. On the other hand, the formula for a VIP sales call (a sales call from a preferred customer) may weigh profitability less than customer satisfaction, in contrast to a "standard" sales call. A simple formula may normalize each score to a 100 point scale, weight each score by a multiplier, sum the weighted scores, and divide the sum by the maximum possible score. Selector 150 then selects the agent who has the best combined score to handle the call, at step 306. The "best" score may either be the highest score, or it may be a just-sufficient score. For example, if a score of "310" is needed and two agents, one with a score of "380" and the other with a score of "350" are available, the one agent has the "best" score according to the former test and the other agent has the "best" score according to the latter test. Optionally, selector 150 selects none of the available agents if none of the agents' combined scores reach a predetermined minimum threshold, and leaves the call waiting in queue for another agent to become available. Selector 150 then ends its operation, at step 308.

Figure 4:
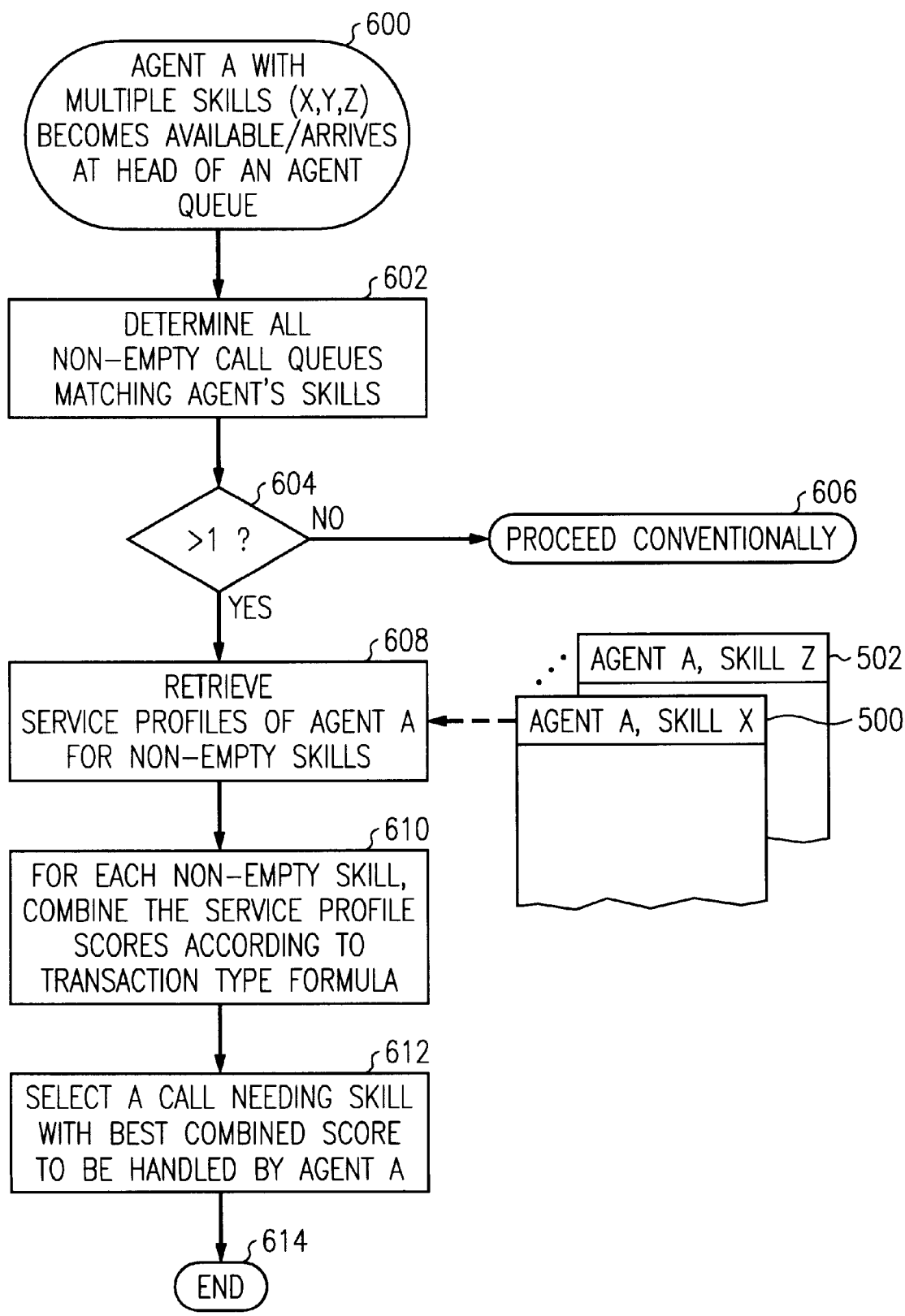
FIG. 4 is a flow diagram of call-selection operations performed by the agent and call selector of the call center of FIG. 1.

The functionality of agent and call selector 150 in selecting a call for an agent is shown in FIG. 4. Upon an agent becoming available or arriving at the head of one of the agent queues 130, at step 600, selector 150 determines which skills this idle agent possesses (e.g., skills X, Y, and Z) and which of those skills have non-empty corresponding call queues 121–129, at step 602. If the number of non-empty corresponding call queues 121–129 is none or one, as determined at step 604, selector 150 proceeds conventionally, at step 606, either enqueuing or leaving the idle agent enqueued in those agent queues 131–139 that correspond to the idle agent's skills if there are no non-empty corresponding call queues, or assigning a call from the one non-empty corresponding call queue to the idle agent and dequeuing the idle agent from all agent queues 130. If selector 150 determines at step 604 that there is a plurality of non-empty corresponding call queues 121–129, selector 150 retrieves the service profiles 500–502 of the idle agent for those skills that correspond to the non-empty call queues 121–129, at step 608. Then, for each of those skills' service profiles of the idle agent, selector 150 combines the service profile scores according to a formula which is a function of the transaction type represented by a call of that skill, at step 610. As was already stated in conjunction with FIG. 3, the formula for each call type is administered (programmed) into the system and may be either algorithm-based (procedural) or rules-based (expert system engine). Selector 150 then selects a call needing the skill that has the best (either highest or just-sufficient) combined score to be handled by the idle agent, at step 612. Optionally, selector 150 selects none of the available calls if none of the agent's combined scores reach a predetermined minimum threshold, and leaves the agent waiting in queue for a call of another skill type to become available. Selector 150 then ends its operation, at step 614.

Of course, it is not necessary that only agents should have corresponding profiles and scores computed therefrom. The same may advantageously be done for calls, and the scores of the agents may then be matched with the scores of the calls to determine which agent should handle what call. This variation is shown in FIGS. 5 and 6.

Figure 5:
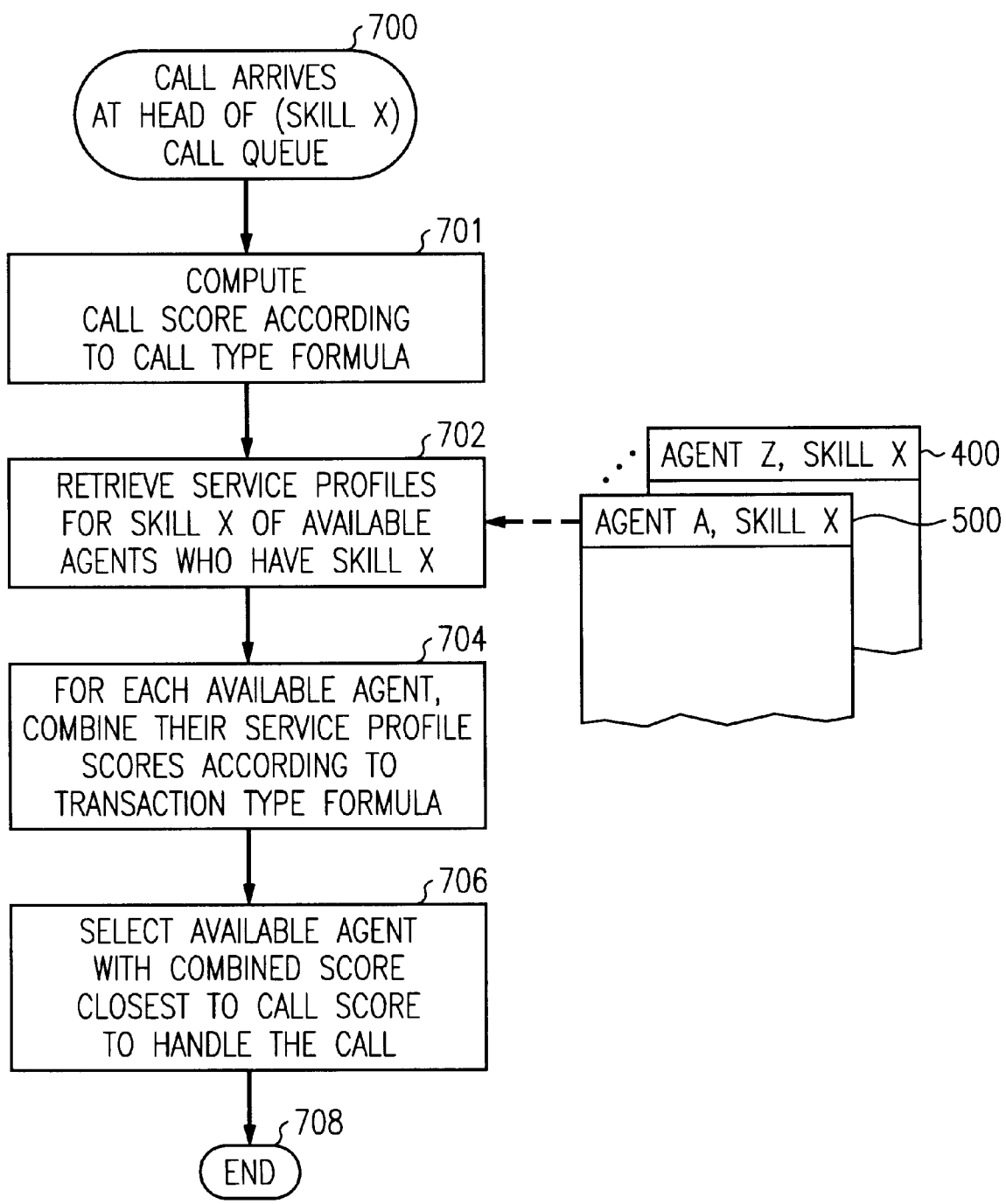
FIG. 5 is a flow diagram of alternative agent-selection operations performed by the agent and call selector of the call center of FIG. 1.

The functionality of agent and call selector 150 in selecting an agent for a call is shown in FIG. 5, which is a variation on FIG. 3. Upon arrival of a call at the head of its queue, at step 700, selector 150 computes a call score for the call according to a call-type formula, at step 701. The computation is illustratively made on the basis of factors such as the purpose of the call (determined from the vector directory number of the call, or the skill queue 120–129 in which the call resides), the in-queue wait time of the call (either actual or predicted), the priority of the call, the caller's ID (such as the ANI or account number), the caller's history (call history or caller's total business history), etc. Typically, the formulas for all call types would be, although they need not be, the same. A simple formula may normalize each factor on a 100 point scale, weight each normalized factor by a multiplier, sum the weighted factors, and divide the sum by the maximum possible score.

Having obtained a call score for the call, agent and call selector 150 proceeds at steps 702–704 to obtain a score for each of the available agents who can handle the call, as at steps 302–304 of FIG. 3. Selector 150 then selects the agent who has the best combined score—in this instance, the agent whose combined score is closest to the call's score—to handle the call, at step 706. Preferably, selector 150 selects the agent whose combined score is closest to the call's score, whether it is higher or lower, within a predetermined range around the call's score, and if no agent is available within this range, selects an agent whose combined score least exceeds the call's score. Selector 150 then ends its operation, at step 708.

Figure 6:
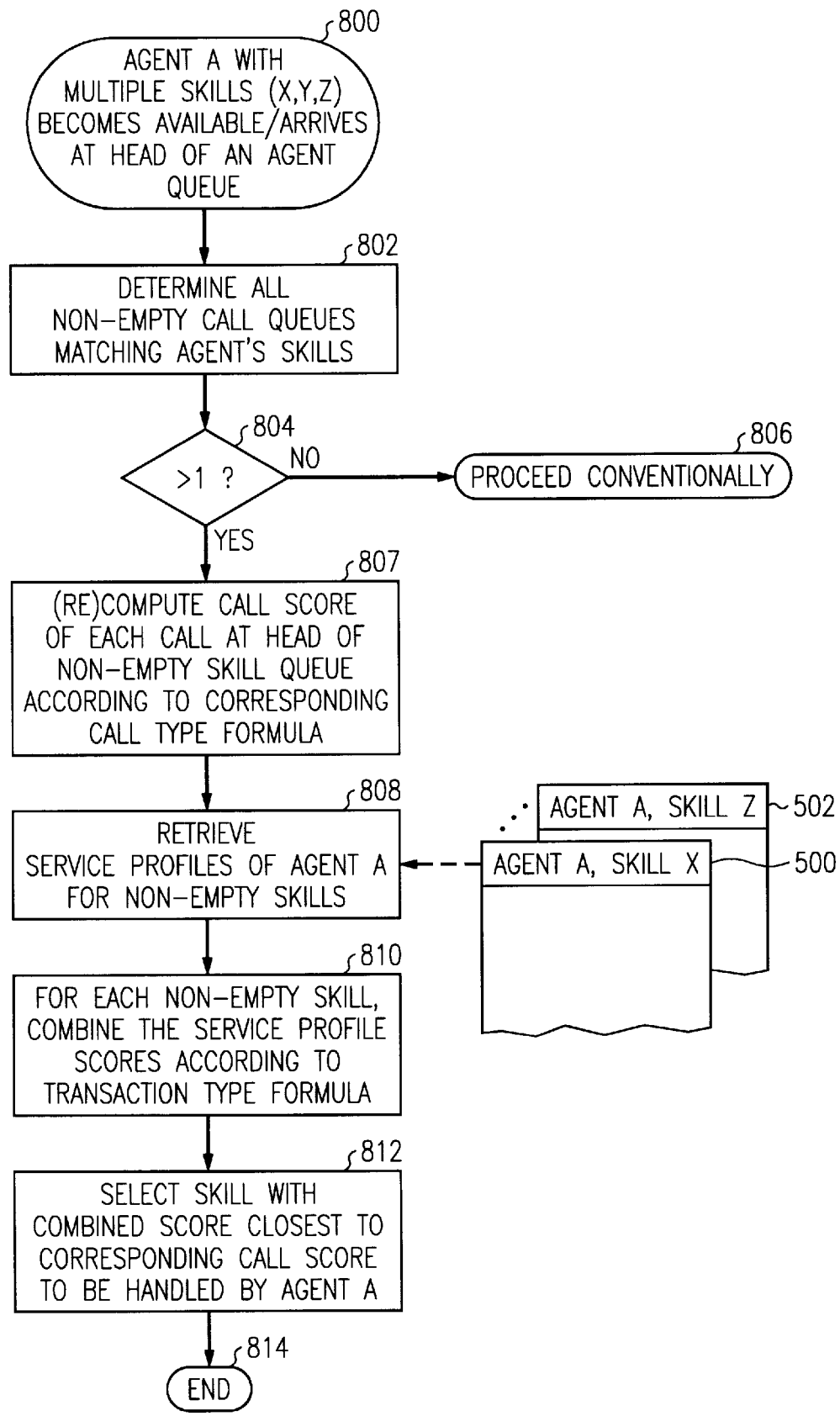
FIG. 6 is a flow diagram of alternative call-selection operations performed by the agent and call selector of the call center of FIG. 1.

The functionality of agent and call selector 150 in selecting a call for an agent is shown in FIG. 6, which is a variation on FIG. 4. Upon an agent becoming available, selector 150 proceeds, at steps 800–808, in the same manner as at steps 600–606 of FIG. 4. If there are calls in multiple call queues 120–129 for the agent to choose from, selector 150 recomputes (updates) the call score for the call at the head of each of those queues according to a call type formula, at step 807, in the manner described for step 701 of FIG. 5. Selector 150 then proceeds, at steps 808–810, to obtain a score for each of the skills of the agent that correspond to the available calls, as at steps 608–610 of FIG. 4. Selector 150 then selects a call of the skill that has the best combined score-in this instance, the call whose score is closest to the agent's combined score for that call type—to be handled by the agent, at step 812, and ends its operation, at step 814.

Of course, various changes and modifications to the illustrative embodiment described above will be apparent to those skilled in the art. For example, the loci of various data and functions are not important and may be changed at will; for example, skill and agent profiles and the agent service profile generator and the agent selector may be located in an adjunct processor. Nor do the profiles need to be updated in real time; such updating may be done only periodically. Also, the call queues and the agent queues may be distributed across a network of multiple ACDs. In this case, preference to distribute calls to other ACDs' agents may affect individual agent profiles, such as when one ACD site is presently working on an overtime-basis while another ACD site is in a different time zone and presently working standard hours. Or, profile weighting can vary depending on present business needs or priorities derived from some external source of customer information. Moreover, if the overall proficiency of a set of agents is judged to need improvement, the agents may be given remedial training, and upon their return to active duty, agents with lower proficiency values may be selected to provide immediate opportunities to apply the remedial training. Also, the service profile scores of all agents may be compared, and the call may remain enqueued if an agent with a high-enough service profile score is predicted to become available shortly. The prediction may illustratively be based on what part of a telescript (a script followed by the agent in handling a call) the agent is presently performing. Furthermore, the system may dynamically change the weighting of individual profile scores or even the score-combining formula to reflect present operating conditions of the call center. For example, it may be that customers with low scores (e.g., grumpy people who seldom buy) need agents with high scores (e.g., very patient, positive, versatile agents) and agents with low scores (e.g., agents with little experience or only average people skills) may be assigned to customers with high scores (e.g., easygoing people who buy frequently). Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of selecting a call for handling by a call handler, comprising the steps of:
   a) in response to availability of a call handler who handles calls of a plurality of types, selecting for handling by the call handler a call of a type for which the call handler has a best performance characteristic score, including retrieving from a service profile of the call handler, comprising present values of a plurality of service metrics for the plurality of call types, the service metrics for each call type having calls available for handling by the call handler, obtaining a performance characteristic score for said each call type by using the retrieved present values of the plurality of service metrics of said each call type in one of a plurality of formulas, each corresponding to a different said call type, and selecting one of the available calls whose call type has a best said score, for handling by the call handler;

b) in response to completion of handling of the selected call by the call handler, evaluating the call handler's performance in handling the selected call; and c) modifying the values of the call handler's service metrics for the call type of the selected call by the valuation of the call handler's performance in handling the selected call to obtain new present values of the service metrics for the call type of the selected call for the call handler.

2. The method of claim 1 wherein:
   the step of obtaining comprises the step of
   combining the retrieved values of the plurality of service metrics of the service profile of each said call type according to said one formula into the score.

3. The method of claim 2 wherein:
   the step of evaluating comprises the step of
   measuring individual said service metrics of the service profile of the one call handler in handling the call, to obtain measured values;
   the step of modifying comprises the steps of
   combining the measured values of the service metrics with the values of the service metrics of the service profile to obtain new values of the service metrics of the service profile.

4. The method of claim 3 wherein:
   the step of combining comprises the steps of
   weighting the measured values of the service metrics relative to the values of the service metrics of the service profile; and
   combining the weighted measured values with the values of the service metrics of the service profile to obtain new values of the service metrics of the service profile.

5. The method of claim 1 wherein:
   the performance characteristic score of an individual call type indicates efficiency of the one call handler in handling a call of the individual type.

6. The method of claim 1 wherein:
   the performance characteristic score of an individual call type indicates benefit generated by the call handler in handling a call of the individual type.

7. The method of claim 6 wherein:

the benefit comprises revenue.

8. The method of claim 1 wherein:

the service metrics of the service profile comprise at least one of efficiency, generated benefit, customer satisfaction, and call handler satisfaction.

9. The method of claim 1 wherein:

the plurality of call types comprise a plurality of skills.

10. The method of claim 1 wherein:

the step of selecting comprises the steps of computing a call score for each said call type having calls available for handling by the call handler, and selecting one of the available calls whose call type has the performance characteristic score best matching the call score of said call type.

11. The method of claim 1 wherein:

the step of selecting comprises the steps of computing a call score for a call of each said call type having calls available for handling by the call handler, and selecting one of the available calls whose call score best matches the performance characteristic score of the corresponding call type.

12. A method of selecting a call for handling by a call hander, comprising the steps of:

in response to availability of a call handler who handles calls of a plurality of types, selecting, for handling by the call handler, a call of a type for which the call handler has a best performance characteristic score, including retrieving from a service profile of the call handler, comprising present values of a plurality of service metrics for the plurality of call types, the service metrics for each call type having calls available for handling by the call handler;

obtaining a performance characteristic score for said each call type by combining the retrieved present values of the plurality of service metrics of said each call type;

obtaining a call score for each said call by combining present values of a plurality of characteristics of each said call; and selecting one of the available calls whose call score best corresponds to the call handler's characteristic score to be handled by the call handler.

13. The method of claim 12 wherein:

the step of obtaining a performance characteristic comprises the step of using the retrieved present values of the plurality of service metrics of said each call type in one of a plurality of formulas, each corresponding to a different said call type.

14. An apparatus that performs the method of claim 1 or 2 or 3 or 4 or 5 or 6 or 7 or 8 or 9 or 10 or 11 or 12 or 13.

15. A computer readable medium containing software which, when executed in a computer, causes the computer to perform the steps of claim 1 or 2 or 3 or 4 or 5 or 6 or 7 or 8 or 9 or 10 or 11 or 12 or 13.

* * * * *